Oct. 22, 1935.  W. D. CATON  2,018,052
RECORD CONTROL FOR TABULATING MACHINES
Filed June 30, 1931  2 Sheets-Sheet 1

INVENTOR.
WILLIAM D. CATON,
BY Duell, Dunn & Anderson
ATTORNEYS.

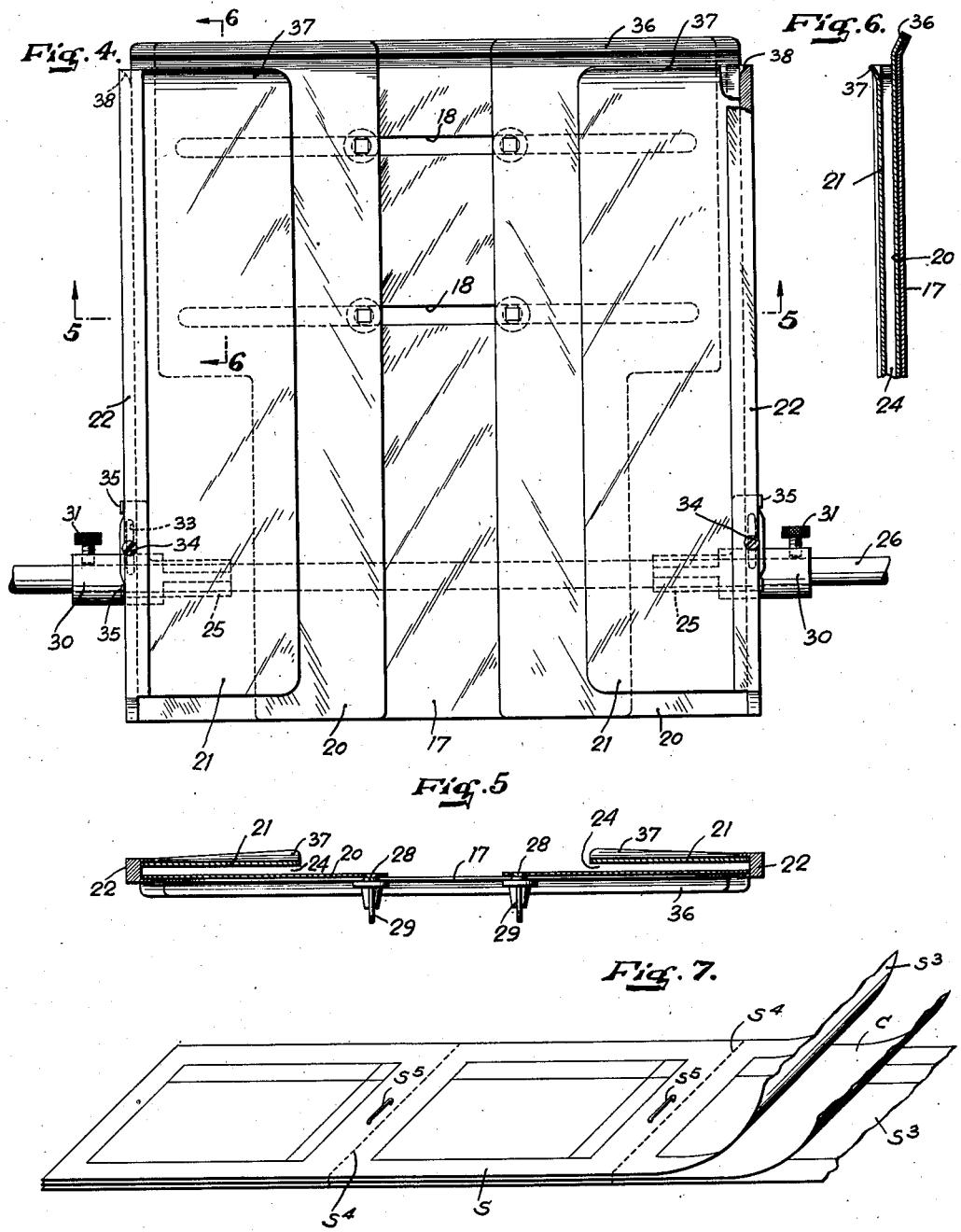

Patented Oct. 22, 1935

2,018,052

UNITED STATES PATENT OFFICE 2,018,052

RECORD CONTROL FOR TABULATING MACHINES

William D. Caton, Elmira, N. Y., assignor, by mesne assignments, to American Sales Book Company, Inc., a corporation of Delaware Application June 30, 1931, Serial No. 547,807

8 Claims. (Cl. 197—133)

This invention relates to improvements in record machines, and with reference to particular features thereof, it relates to improvements in means for controlling and guiding the work webs or record strips so as to position and maintain them at all times in precise longitudinal alignment with the record-making instrumentalities and to maintain the different record strips in precise alignment with each other, both laterally and longitudinally, in the event that a plurality of relatively superposed record strips are employed.

While the improved record controlling mechanism is applicable to many different types of recording or writing machines, such as typewriting machines, billing machines, accounting and bookkeeping machines, addressing machines, adding machines, etc., it is especially well adapted, and attains a high degree of utility, when used in connection with tabulating machines, such as the Hollerith automatic tabulator, upon which, for illustrative purposes, it is herein disclosed.

It is a general object of the invention to provide an improved record controlling and aligning mechanism which is particularly effective in positioning the record for the reception of the impressions or inscriptions and in maintaining precision of record alignment so that the impressions will always be made in definite positions, and displacement thereof is effectually avoided. While the record controlling mechanism is especially well adapted for the control of records of the long, continuous, traveler type, embodying either a single record strip or a plurality of relatively superposed strips, it is also effective for controlling and aligning separate record leaves or sheets, such as letter-size sheets with or without interleaved carbon sheets. As herein disclosed, it is also often convenient to employ long, continuous, carbon strips or webs interleaved with the continuous record strips, and the record controlling mechanism is well adapted for the control of these records.

A further object of the invention is to provide, for machines of the class mentioned, an improved record control or guiding means which can be easily applied to existing machines and is provided with an improved arrangement for supporting it in correct operative position with reference to the machine platen and other operative parts.

Still another object of the invention is to provide an improved record control for machines of the class mentioned, embodying an improved arrangement for compensating for the tendency of the cylindrical platen to cause longitudinal disalignment of the relatively superposed record strips. By means of this improvement, long, continuous record strips may be maintained in correct longitudinal alignment, with the blank forms or writing spaces in exact superposed registry, during all stages of consumption of the record.

A further object of the invention is to provide, for machines of the class mentioned, an improved record guiding means having flat lateral guiding members adapted to contact directly with the longitudinal edges of the record so as to adjust the record strips laterally relatively to each other, maintaining them at all times in exact lateral alignment. These lateral strip guides are also preferably positioned opposite to a longitudinally warped or curved guiding surface whereby the transverse strip alignment is more readily and effectively accomplished. The guiding mechanism is also preferably arranged for convenient lateral adjustment of these lateral strip guides for the accommodation of records of different widths.

Still another object of the invention is to provide a record controlling and guiding mechanism having an improved arrangement whereby the record is guided and directed as it emerges from the platen, and so that a record which has been previously transversely creased or zigzag folded will, under the feeding influence of the platen and the directive guiding influence of the guide, be again folded into a compact, zigzag file pack.

According to another feature of the invention, a removable tearing table for the inscribed record is positioned adjacent to the rear side of the platen, where these strips emerge to facilitate severing thereof.

Other objects of the invention will be in part pointed out in the following detailed description of an illustrative but preferred embodiment of the invention and will be in part obvious in connection therewith.

The invention accordingly comprises the features of construction, combinations of elements, and arrangement of parts, which will be exemplified in the construction hereinafter set forth and the scope of the application of which will be indicated in the claims.

For a more complete disclosure of the nature and the objects of the invention reference is had to the following detailed description and to the accompanying drawings, in which, Fig. 1 is a fragmentary partially diagrammatic elevation showing the invention as applied to a tabulating machine of a familiar type, parts being broken away and in section to disclose important features.

Fig. 4 is a plan view of Fig. 2.

Fig. 5 is a transverse section substantially on the line 5—5 of Fig. 4, looking in the direction of the arrows.

Fig. 6 is a detail section on the line 6—6 of Fig. 4, looking in the direction of the arrows.

Fig. 7 is a fragmentary perspective view of a preferred form of record supplies for which the improved control is particularly well adapted.

Figure 1:
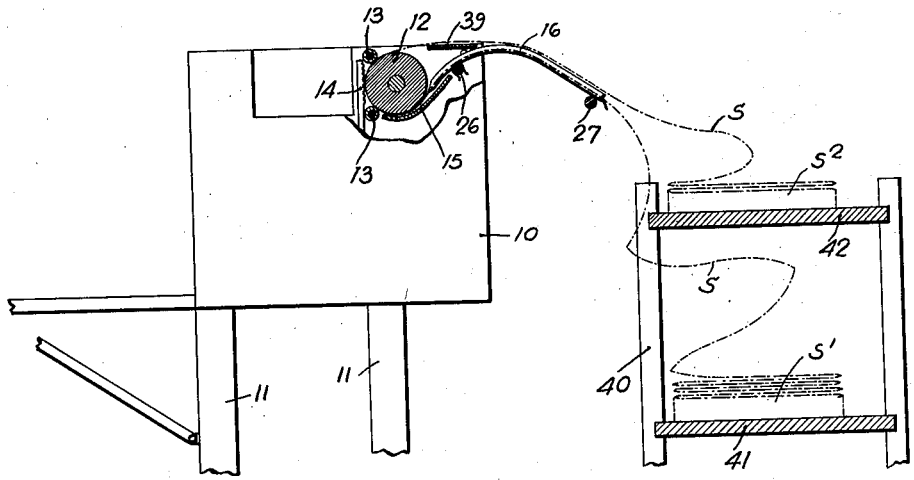
Figure 2:
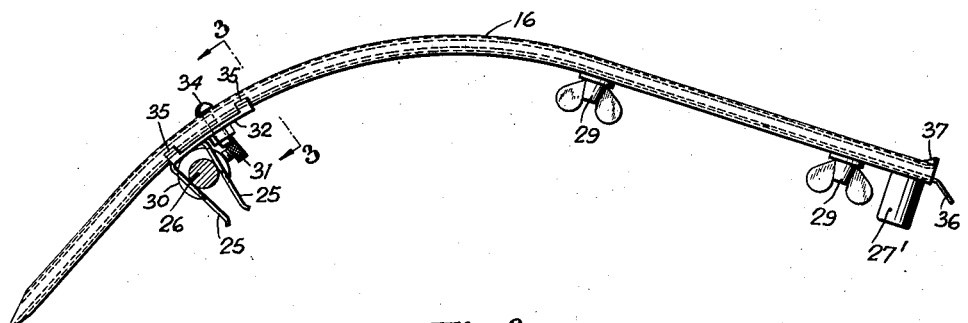
Fig. 2 is an enlarged sectional elevation showing the improved record guide.
Figure 3:
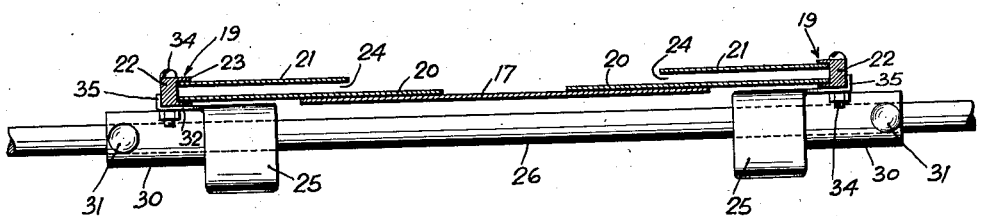
Fig. 3 is a transverse sectional elevation taken substantially on the line 3—3 of Fig. 2, looking in the direction of the arrows.

Referring to the drawings for a detailed description of the illustrative embodiment of the invention, the improved record control is shown as applied to a tabulating and accounting machine well known to those skilled in the art, and often referred to as the Hollerith machine or Hollerith automatic tabulator. Since this machine is well known it need not be described in detail, and as diagrammatically shown includes a frame or supporting structure 10 with supporting pedestal 11 whereby the machine can be supported upon the floor. This tabulating machine is provided with a cylindrical rotary platen 12 for supporting the record strips or webs in writing position, being appropriately mounted in bearings in the frame 10, and record guiding and gripping rollers 13 contact therewith and are appropriately supported by the frame. Type bars 14, as many as desired for the tabulating or accounting work, are carried by the machine with the type surfaces adjacent to the platen and are longitudinally adjusted up and down by automatic mechanism to bring the desired figure or character in position to make the impression upon the record strips carried by the platen 12 as will be understood by those familiar with this type of machine. A guide plate 15 is positioned to guide the record strips to the entry side of the platen.

It is of a great deal of importance that the record strips carried by the platen be always maintained in correct lateral as well as longitudinal alignment in order that the figures or other characters impressed by the type bars 14 may always appear in the correct columns or blank spaces provided therefor upon the record strips. If for example, one or more of the record strips is slightly out of correct lateral alignment with reference to the type bars, then the figures will be impressed thereon and appear in the wrong column or columns, thus giving to them a different significance than that intended. Also if the strips are longitudinally disaligned the figures will appear incorrectly positioned upon the record strips. Therefore an improved guiding mechanism for preventing such disalignment of the records is herein disclosed being arranged for ready application to the complete tabulating machine with little or no alteration of the latter.

This improved record strip controlling and guiding mechanism indicated generally at 16, as herein disclosed includes a supporting or base plate 17 preferably of metal or other appropriate material and provided with transverse slots 18 spaced apart longitudinally of the plate. This base plate may vary in longitudinal and transverse dimensions, and is longitudinally curved or convexed upwardly adjacent to the platen 12, the curvature being opposite to that of the cylindrical platen surface for a purpose later described. This base plate is adapted for supporting the laterally disposed channelled record guide members of which there are two indicated generally at 19.

Both record guide members 19 are of similar construction each including a lower record guide plate 20 and an upper record guide plate 21 spaced slightly from the lower plate, these plates being connected together by a bar or edge supporting and strip guiding member 22. For this purpose each supporting bar 22 is preferably provided with upper and lower flanges 23 to which the guiding plates 20 and 21 may be secured in any appropriate manner as by soldering, brazing or welding. Each lateral record guide 19 thus is provided with a relatively deep guiding channel 24 in which the edges of the record are received.

It is to be observed that the lower and upper guide plates 20 and 21 as well as the edge supporting bars 22 are also convexed or curved upwardly in the vicinity of the platen providing longitudinal curvature of the guiding channels 24. The bottom of each guiding channel 24 shown as formed by the supporting bar 22 is preferably flat, all parts thereof which engage the edges of the record being in the same vertical plane so that each record strip, in case a plurality of relatively superposed strips are employed, is subjected to the same lateral guiding influence, the tendency thus being to maintain all of the superposed strips in precise lateral alignment with each other.

For supporting the record guide 16 in correct position upon the tabulating machine each of the lateral record guiding members 19 is preferably provided with an attaching lug or clamp 25, conveniently in the form of a bifurcated spring clamp extending downwardly from the lower surface of the guide and positioned for straddling or sliding upon the supporting bar 26 ordinarily forming a part of the frame of the tabulating machine. When the spring clamps are pressed down into position upon the supporting bar the latter seats snugly and firmly at the bottom of the clamp so as to maintain the guide firmly in correct position. The attaching and supporting clamps 25 are shown as positioned toward the forward end of the guide, and an additional support 27 which may also be a part of the tabulating machine is arranged to support the guide toward the rearward end thereof. This arrangement provides a firm support for the guide. One or a plurality of laterally spaced supporting blocks or stools 27', preferably of resilient rubber, may be attached to the under side of the record guide near the forward end to rest upon the support 27 or other part of the tabulator.

Each lateral record guide 19 is adjustably supported by the base plate 17 by means of threaded studs 28 extending through the respective guiding slots 18 and carrying clamping nuts 29. This provides lateral adjustment for the record guide for the accommodation of records of different widths.

It will be observed that the lateral adjustments of the record guides 19 will vary the positions of the attaching lugs or clamps 25 along the supporting bar 26. For this reason supporting lugs 30 are provided which are adjustable laterally of the record path. These adjustable supporting lugs 30 are conveniently mounted upon the supchannels 24 are positioned laterally opposite to the arched strip guiding surfaces formed by the plates 20 and 21. Furthermore, it will be noticed that the plane or flat record-edge contact surfaces formed by the supporting bars 22 tend always to keep the edges of the strip and thus the forms thereon in correct lateral alignment. These flat-surfaced guides are therefore of importance in maintaining all of the record strips in correct lateral alignment.

If for example one of the superposed strips has become slightly laterally disaligned from the others, and its edge projects laterally beyond the edges of the others, said projecting edge will contact with the flat surfaced guide as the strips are fed, thus urging the disaligned strip into alignment again. Due to the strip arching mentioned with consequent strip stiffening, the aligning effort or impulse of the guide 22 is more effective to cause the desired alignment, and the tendency to bend or crumple the disaligned strip edge is diminished. Also since the superposed strip edges are confined in the guide channels 24 warping, bulging, etc. of the strips are restricted and the strips are maintained in their natural plane whereby aligning effort of the guide is most effectual.

All of the foregoing different factors therefore contribute toward maintaining all of the record strips in precise alignment with each other both laterally and longitudinally, thus assuring that the figures or characters will be entered on each strip in the correct space provided therefor. In other words, the probability of the figures or digits being displaced from their prescribed column or position upon any of the record strips is reduced to a minimum by means of this improved record controlling arrangement.

As the inscribed record strip emerges from the platen under the feeding influence of the latter, it is projected over the upper downwardly inclined surface of the guide plates 21 and is thus caused to be refolded in zigzag condition in the file pack 32, as above mentioned. However, if at any time it is desired to sever the inscribed record, this may be conveniently accomplished by tearing along the weakened lines S6 utilizing the upper horizontal surface of the tearing table 39 for this purpose. Table 39 also serves as a guide plate for guiding the strips emerging from the upper portion of the platen onto the downwardly inclined part of the record guide. In this manner each set of inscribed sheets or leaves may be severed from the record. If the staples or pasting or other securing devices S5 are employed for attaching the record and carbon strips together, each set of inscribed sheets or leaves thus severed will be attached together in a group. These leaves may be subsequently detached from each other and separated for distribution as desired. Any preferred means for aiding in separating the carbons from the record leaves, such as selective notching at the edges, may be utilized. If the securing stitches or staples S5 are employed they will aid also in maintaining the different record strips in correct alignment with each other.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a record machine, in combination, a cylindrical platen, a record guide positioned at the entrance side of said platen and having a record guiding surface longitudinally curved oppositely to platen curvature and having laterally disposed guiding channels with flat, opposed, parallel, edge guiding surfaces for receiving and guiding the longitudinal edges of the record, said guide having a second guiding surface relatively superposed with the first guiding surface and outside of the latter for guiding the inscribed record emerging rearwardly from said platen, said second guiding surface having a rearwardly and downwardly inclined part for guiding the inscribed record into folded condition, an intermediate strip-guiding plate positioned between the upper part of said platen and said downwardly inclined guiding part, and a record support adjacent said inclined part for receiving the folded record.

2. In a record machine, in combination, a cylindrical platen, a record filing support positioned rearwardly of said platen and a record guide positioned between said platen and said support, and having a rearwardly and downwardly inclined guiding surface over which the record is fed by the platen into zigzag folded condition upon said support, said guide having also a guiding surface relatively superposed with and positioned inside of the first mentioned guiding surface for guiding the record from a supply to the platen, said guide having flat, opposed, parallel edge guiding surfaces for the longitudinal edges of the record and having a longitudinally curved part adjacent the platen, with its curvature opposite to that of the platen, and an intermediate strip-guiding plate positioned between the upper part of said platen and said downwardly inclined guiding surface.

3. In a record machine, in combination, a cylindrical platen, and a record guide positioned at the entrance side of said platen and having a record guiding surface longitudinally curved oppositely to platen curvature and having laterally disposed longitudinally curved guiding channels for receiving and guiding the longitudinal edges of the record, each of said guiding channels having, at parts thereof opposite to said longitudinally curved guiding surface, a flat guiding surface substantially at right angles to said first mentioned guiding surface and being parallel with each other and positioned for engagement with the record edges directly laterally opposite to the longitudinal curvature of said guiding channels, longitudinally extending marginal supporting bars embodied in said guiding channels and having a heavy structural web and inwardly extending upper and lower flanges to which upper and lower inwardly extending guiding plates are attached, and a supporting clip attached to each of said heavy marginal supporting bars for attaching and supporting the record guide in operative position.

4. In a record control and guide, in combination, a longitudinally curved supporting plate, longitudinally extending marginal supporting channel bars with heavy structural webs and inwardly extending upper and lower flanges and being longitudinally curved corresponding to the curvature of said supporting plate, longitudinally extending upper and lower record guiding plates marginally connected respectively to said upper and lower flanges and extending inwardly therefrom toward each other, said supporting plate porting bar 26 being slotted for the reception of the bar and provided with set screws 31 for locking them in adjusted position. Therefore it will be seen that the supporting lugs 30 can readily be adjusted so as to contact with the respective attaching clamps 25 in any lateral adjustment of the record guides 19. When the lateral guides have been once adjusted for the accommodation of any given width of record and the retaining lugs 30 correspondingly adjusted, the record guide as a whole is held in its correct lateral position, and if necessary to remove it for any purpose it may be replaced again into its operative position in exact lateral and longitudinal alignment by the aid of these supporting and attaching lugs 25 and 30, which also seem to direct the record control device into its correct position as well as to maintain it there.

For the purpose of adjusting the complete record control 16 longitudinally the attaching lugs 25 are preferably longitudinally adjustably attached to the supporting bars 22. Each attaching lug 25 is shown as being provided with a supporting flange 32 slotted at 33 for the reception of an attaching bolt 34 passing through an opening in the supporting bar 22. Each supporting flange 32 may be additionally provided with outer off set retaining lugs 35 positioned for engagement with the outer face of the supporting bar. Each attaching lug or clamp 25 is thus readily longitudinally adjustable but at the same time is firmly supported in its adjusted position.

At the rear or record entrance side of the guide the base plate 17 and lower guide plates 20 are preferably downwardly turned or flared at 36 away from the record path and the adjacent edge of each upper guide plate is correspondingly turned or flared in the opposite direction at 37, while the proximate ends of the guide bars 22 are similarly rounded or flared outwardly, laterally at 38. Flared or inclined guiding surfaces 36, 37 and 38 are thus provided for guiding the record as it enters the controlling mechanism, preventing obstruction to record feed by any projections or irregularities of the record.

At the rearward side of the platen 12 but adjacent thereto, a record supporting and severing table 39 is preferably provided extending transversely of the record path and detachably supported upon the frame 10 and in any convenient manner. This severance table is adapted to support the record strip as it emerges in an inscribed condition from the platen and may conveniently be utilized as a severance table to facilitate severance of the record strips which are preferably provided with weakened transverse severance lines. Such severance may be readily effected by pressing the record at one side of the severance line while tearing along said line is effected.

A support 40 for the record is preferably provided adjacent to the tabulating machine either directly attached thereto or separate as shown and having a lower shelf 41 for carrying the record supply S1 and an upper shelf 42 for receiving and supporting a file pack S2 of inscribed record strips. This record support is positioned adjacent the rear or entry end of the guide 16 so that the record S is led directly from the zigzag folded supply S1 into the controlling and guiding means. It will be observed that the guide 16 is downwardly and rearwardly inclined at the rear part thereof adjacent to the record support. The upper surfaces of the guide plates 21 thus function to guide the inscribed parts of the record from the platen into folded condition in the file pack S2.

The inclination of this guiding surface and its distance from the file pack S2 are such that the inscribed record under the rearward feeding impulse of the platen together with the effect of gravity will cause the record which has previously been folded or creased in the supply pack S1 to fold naturally again into zigzag condition in the file pack S2. The shelf 42 may be adjustable up and down so as to position the file pack for most advantageous folding.

While the improved record control is suitable for guiding various forms of record it is especially effective in controlling the long continuous traveller type of record S as shown in Figs. 1 and 7. This form of record as indicated in Fig. 7 may include a plurality of record strips S3 with interleaved long continuous carbon strip C. Any desired number of record strips with interleaved carbon strips may be assembled in this manner to provide a continuous composite traveller record. Each of the record strips S3 will ordinarily be provided with appropriate blank forms for the reception of the tabulations and arranged in definite positions upon the strips. Each record and carbon strip will also ordinarily be provided with weakened transverse severance lines S4 between the respective blank forms for facilitating the severance. While the strips may be free of each other it is often convenient to attach them at intervals for the purpose of further aiding in maintaining correct alignment and registry. For this purpose attaching devices S5 in the form of light threads or light wire staples may be conveniently provided extending through the strips and positioned in a longitudinal series, at least one such securing device being provided adjacent each severance line.

When the guide 16 is in operative position upon the record machine the forward edge thereof will be in a position closely adjacent to the entrance side of the platen 12 (see Fig. 1) with the upwardly convexed guiding surface thereof positioned adjacent to the platen. This guiding surface is curved oppositely to the platen surface, thus providing a reversely curved or ogee path for the record. This arched or convexed guiding surface thus serves to compensate for the tendency of the superposed record strips to become longitudinally disaligned when fed around the cylindrical platen. It is well understood in this art that superposed record strips when fed by a cylindrical platen tend to become longitudinally disaligned and such disalignment is progressive as feed continues, becoming sufficient to cause serious disalignment of the record forms especially in records of the long continuous traveler type. Therefore, one important function of this arched or convexed guiding surface is to compensate for this disaligning tendency. Since the guide curvature is opposed to that of the platen, the disaligning tendency is opposed to that of the platen, the net result being the tendency to maintain the record strips in correct longitudinal alignment with each other.

Another important result of the longitudinal guide curvature is to strengthen and stiffen the record strips to crumpling tendency under lateral aligning effort exerted at the opposite edges of the record by the channel guides 19. Since the portions of the record laterally opposite to these guide channels are arched, a much greater aligning effort can be exerted upon the record edges without crumpling than would be the case where a flat guiding surface is used. In this connection it will be observed that the strip guiding extending between said lower record guiding plates, and adjusting connections between said lower guiding plates and said supporting plate for varying the guide width, said supporting bars having flat record guiding parallel surfaces positioned for edge contact with the record and substantially at right angles with said upper and lower guiding plates.

5. A record control and guide including, in combination, a lower longitudinally curved record guiding base including one or more guiding plates, opposite laterally positioned longitudinally extending upper guiding plates spaced upwardly from said base and correspondingly longitudinally curved to provide longitudinally curved guiding channels for the record edges and to provide a superposed exterior record guiding surface, longitudinally extending rigidifying frame members positioned marginally of the guide between said base and said upper guiding plates for supporting the latter, each of said frame members having a relatively heavy web with upper and lower inwardly extending flanges to which the base plates and upper guiding plates are respectively attached, each of said frame members having a curved flat guiding surface positioned at the bottom of the respective channel for engagement with the record edge, said flat guiding surfaces being parallel with each other and with the course of the record and lying perpendicular to the plane of said record.

6. A record control and guide including, in combination, a lower longitudinally curved record guiding base including one or more guiding plates, opposite laterally positioned longitudinally extending upper guiding plates spaced upwardly from said base and correspondingly longitudinally curved to provide longitudinally curved guiding channels for the record edges and to provide a superposed exterior record guiding surface, longitudinally extending rigidifying frame members positioned marginally of the guide between said base and said upper guiding plates for supporting the latter, each of said frame members having a relatively heavy web with upper and lower inwardly extending flanges to which the base plates and upper guiding plates are respectively attached, each of said frame members having a curved flat guiding surface positioned at the bottom of the respective channel for engagement with the record edge, said flat guiding surfaces being parallel with each other and with the course of the record and lying perpendicular to the plane of said record, and a supporting clip attached to each of said frame members for attaching and supporting the record guide in operative position.

7. A record control guide for writing machines including, in combination, two pairs of relatively superposed, parallel, longitudinally curved, record, guide plates side by side and cooperative to cause a record strip passing therebetween to move in a curved path, curved lateral guide bars having flanges to which the edges of said plates are connected respectively, a supporting bar, and means for supporting said guide bars in different positions longitudinally of said supporting bar.

8. A record control guide for writing machines including, in combination, two pairs of relatively superposed, parallel, longitudinally curved, record, guide plates side by side and cooperative to cause record strips passing therebetween to move in a curved path, curved lateral guide bars having flanges to which the edges of said plates are connected respectively, a supporting bar, means for supporting said guide bars in different positions longitudinally of said supporting bar, a curved record supporting base plate, and means cooperative to adjust said base plate to different positions transversely of said pair of record guide plates.

WILLIAM D. CATON.